United States Patent
Murakami et al.

(10) Patent No.: US 7,270,607 B2
(45) Date of Patent: Sep. 18, 2007

(54) CONSTANT VELOCITY UNIVERSAL JOINT AND METHOD OF MANUFACTURING THE SAME

(75) Inventors: Hiroshi Murakami, Iwata (JP); Chikara Ohki, Kuwana (JP)

(73) Assignee: NTN Corporation, Osaka (JP)

( * ) Notice: Subject to any disclaimer, the term of this patent is extended or adjusted under 35 U.S.C. 154(b) by 141 days.

(21) Appl. No.: 10/857,982

(22) Filed: Jun. 2, 2004

(65) Prior Publication Data
US 2004/0248657 A1    Dec. 9, 2004

(30) Foreign Application Priority Data
Jun. 5, 2003    (JP)    ............... 2003-161357

(51) Int. Cl.
*F16D 3/205*    (2006.01)
(52) U.S. Cl. ...................... 464/111; 464/905
(58) Field of Classification Search ............... 464/111, 464/140, 144–146, 904–906
See application file for complete search history.

(56) References Cited

U.S. PATENT DOCUMENTS

| | | | |
|---|---|---|---|
| 5,352,303 A | 10/1994 | Murakami et al. | |
| 6,224,688 B1 | 5/2001 | Takemura et al. | |
| 6,478,682 B1 * | 11/2002 | Kura et al. | 464/111 |
| 6,488,789 B2 * | 12/2002 | Tajima et al. | |
| 6,660,105 B1 * | 12/2003 | Ochi et al. | |
| 2002/0028711 A1 | 3/2002 | Ishiguro et al. | |
| 2002/0040744 A1 | 4/2002 | Kanisawa et al. | |
| 2003/0073501 A1 | 4/2003 | Goto et al. | |
| 2003/0123769 A1 | 7/2003 | Ohki | |

FOREIGN PATENT DOCUMENTS

| | | |
|---|---|---|
| EP | 0 718 513 A1 | 6/1996 |
| EP | 0933440 * | 8/1999 |
| GB | 2 345 116 A | 6/2000 |

OTHER PUBLICATIONS

Tsushima Masayuki et al., Patent Abstracts of Japan, "Rolling Bearing", Publication No. 08-004774, Publication Date: Jan. 9, 1996.

Kura Hisaaki et al., Patent Abstracts of Japan, "Constant Velocity Universal Joint", Publication No. 2000-320563, Publication Date: Nov. 24, 2000.

*ASTM Committee E-4 and Grain Size Measurements* from http://www.metallography.com/grain.htm downloaded Aug. 28, 2006; originally published in ASTM *Standardization News*, May 1991 as Committee E-4 and Grain Size Measurements: 75 years of progress.

(Continued)

*Primary Examiner*—Greg Binda

(57) ABSTRACT

To provide a constant velocity universal joint having a high resistance to cracking, a high dimensional stability and an excellent rolling fatigue life, the constant velocity universal joint includes an outer coupling member (5), an inner coupling member such as a tripod member (2), and a drive transmitting member such as rollers (7) operatively interposed between the outer and inner coupling members (5 and 2). At least one of the outer coupling member (5), the tripod member (2) and the rollers (7) has a carbonitrided layer and, at the same time, an austenite grain size is greater than the grade of No. 10.

2 Claims, 11 Drawing Sheets

OTHER PUBLICATIONS

European Patent Office Examination Report for Application No. 04 012 685.6-2423; dated Mar. 9, 2006 (3 pages).

International Standard ISO 643—Steels—Micrographic determination of the apparent grain size, 2nd edition; Reference No. ISO 643:2003(E); Feb. 15, 2003.

George Vander Voort, "ASTM Committee E-4 and Grain Size Measurements", http://www.metallography.com/grain.htm, pp. 1-6; May 1991.

"Steels—Micrographic determination of the apparent grain size", JIS Japanese Industrial Standard, JIS G 0551:2005 (JISF/JSA); Reference No. JIS G 0551: 2005 (E); 77.040.99; 77.080.20; Jan. 20, 2005.

* cited by examiner

CONSTANT VELOCITY UNIVERSAL JOINT AND METHOD OF MANUFACTURING THE SAME

BACKGROUND OF THE INVENTION

1. Field of the Invention

The present invention generally relates to a constant velocity universal joint and a method of manufacturing the same. More particularly, the present invention relates to the constant velocity universal joint of a type capable of withstanding rolling fatigue for a prolonged period of time and having a high resistance to cracking and, also, a resistance to secular change in dimension, and the method of manufacturing such constant velocity universal joint.

2. Description of the Prior Art

The constant velocity universal joint is well known in the art and is so designed to connect drive and driven shafts together there through so that even though the drive and driven shafts lie at an angle relative to each other, a rotatory drive can be transmitted from the drive shaft to the driven shaft The constant velocity universal joint generally comprises an outer coupling member, an inner coupling member and a rollable drive-transmitting member interposed between the outer and inner coupling members. Since in the constant velocity universal joint, the rotatory drive is transmitted from one of the outer and inner coupling members to the other of the outer and inner coupling member while the angle between the drive and driven shafts is accommodated by a rolling motion of the drive transmitting member, the drive transmitting member and the outer and inner coupling members are placed under severe conditions with respect to the rolling fatigue. Because of this, heat treatment is generally applied to the inner and outer coupling members and the drive-transmitting member so that they can have a prolonged lifetime against the rolling fatigue. In this connection, the need has arisen to improve the heat treatment method to enhance the rolling fatigue life.

On the other hand, the constant velocity universal joint is currently available in some types, including a tripod type, an improved version of the tripod type such as disclosed in the Japanese Laid-open Patent Publication No. 2000-320563, and a ball joint type.

In a rolling bearing which is a mechanical component of a type utilizing rolling elements as is the case with the constant velocity universal joint, as a method of heat treatment effective to increase the lifetime of the rolling bearing against the rolling fatigue, the Japanese Laid-open Patent Publication No. 8-4774 discloses a heat treating method in which the atmosphere under which heat treatment is carried out contains an ammonium gas in addition to the RX gas so that a surface region of a component part of the rolling bearing can have a carbonitrided layer. The use of this known carbonitriding treatment is effective to harden the surface region of the component part, causing a residue austenite structure to grow in the microstructure to thereby increase the rolling fatigue life.

However, since the constant velocity universal joint operates to transmit the rotatory drive from one of the inner and outer coupling members to the other of the inner and outer coupling members while the angle between the drive and driven shafts is accommodated by the rolling motion of the drive transmitting member, a relatively large load tends to act on contact portions of the drive transmitting member, with the bearing pressure at portions of contact between the inner and outer coupling members and the drive transmitting member increased consequently. In addition, in the constant velocity universal joint employed in the modern automotive vehicles, the need has arisen to reduce the size and weight of the constant velocity universal joint and, therefore, improvement in rolling fatigue lifetime is pressing.

Since the carbonitriding treatment is a diffusion process in which carbon and nitrogen are diffused, the material to be treated must be retained at an elevated temperature for a substantial length of time. In view of this, it is difficult to increase the resistance to cracking because the structure tends to become coarse. Also, a problem is arisen in that secular change in dimension tends to increase as a result of increase of the residue austenite.

On the other hand, to secure a prolonged lifetime against the rolling fatigue, increase the resistance to cracking and to inhibit increase of the secular change in dimension, it may be possible to achieve those objectives by employing an alloy instead of steel. However, with the design of an alloy, a problem such as an increase of material cost would arise.

Considering that a high load and an elevated temperature in the environment of use are increasingly imposed on component parts of the constant velocity universal joint, future's component parts of constant velocity universal joints are required to have such characteristics as to withstand against the high load and the elevated temperature. Accordingly, the need has arisen to develop and manufacture those component parts having a high strength, a prolonged lifetime against the rolling fatigue, a high resistance to cracking, and a high stability against secular dimensional change.

SUMMARY OF THE INVENTION

Accordingly, the present invention is intended to provide an improved constant velocity universal joint having a high resistance to cracking, a high dimensional stability and a prolonged rolling fatigue lifetime.

Another important object of the present invention is to provide a method of manufacturing the constant velocity universal joint of the type referred to above.

In order to accomplish these objects of the present invention, the constant velocity universal joint designed and proposed in accordance with the teachings of the present invention includes an outer coupling member, an inner coupling member, and a drive-transmitting member operatively interposed between the outer and inner coupling members. At least one of said outer coupling member, said inner coupling member and said drive transmitting member has a carbonitrided layer and, at the same time, an austenite grain size is greater than the grade of No. 10.

According to one aspect of the present invention, the feature that at least one of the outer coupling member, the inner coupling member and the drive transmitting member has a carbonitrided layer and, at the same time, an austenite grain size is greater than the grade of No. 10 is effective to considerably improve the resistance to cracking, the dimensional stability and the rolling fatigue life. If the austenite grain size is equal to or smaller than the grade of No. 10, the rolling fatigue life is not improved so much and, therefore, the austenite grain size greater than the grade of No. 10, and generally equal to or greater than the grade of No. 11, has to be chosen. While the austenite grain size is preferred to be as fine as possible, it is generally difficult to have the austenite grain size in excess of the grade of No. 13. Accordingly, in the practice of the present invention, the austenite grain size may be in excess of the grade of No. 10, but not in excess of the grade of No. 13.

It is to be noted that the austenite grain contained at least one of the outer coupling member, the inner coupling member, and the drive transmitting member of the constant velocity universal joint does not vary not only in the surface region, which has been considerably influenced by the carbonitriding treatment, but also in an inner region inwardly of such surface region. Accordingly, the position where the range of the grades of the austenite grain size discussed above is dominated lies in the surface region and the inner region inwardly of such surface region. Also, the austenite grain referred to hereinabove and hereinafter is austenite crystalline particles in which phase transformation has taken place during the heat treatment and which, even though transformed in phase into martensite as a result of cooling, remain as a past history.

It is also to be noted that the wording "at least one of the outer coupling member, the inner coupling member and the drive transmitting member" of the constant velocity universal joint referred to hereinabove and hereinafter is intended to encompass all of the outer coupling member, the inner coupling member and the drive transmitting member; the outer and inner coupling members; the inner coupling member, and the drive transmitting member; the drive transmitting member and the outer coupling member; and only one of the outer coupling member, the inner coupling member, and the drive transmitting member.

Alternatively, the constant velocity universal joint of the present invention including an outer coupling member, an inner coupling member, and a drive transmitting member operatively interposed between the outer and inner coupling members may be of a design in which at least one of said outer coupling member, said inner coupling member, and said drive transmitting member has a carbonitrided layer and, at the same time, a breaking stress equal to or higher than 2,650 MPa.

The inventors of the present invention have found that when after steel has been subjected to a carbonitriding treatment at a carbonitriding temperature in excess of the $A_1$ transformation point the steel is cooled down to a temperature equal to or lower than the $A_1$ transformation point, followed by a second hardening including a reheating of the steel at a temperature equal to or higher than the $A_1$ transformation point, and subsequent cooling of the steel, the breaking stress value of the steel having the carbonitrided layer could attain a value equal to or higher than 2650 MPa which has not hitherto been achieved. Accordingly, as compared with the conventional one the constant velocity universal joint having an excellent breaking stress value and also having an excellent resistance to cracking, dimensional stability and rolling fatigue life could be obtained.

Again alternatively, the constant velocity universal joint of the present invention including an outer coupling member, an inner coupling member, and a drive transmitting member operatively interposed between the outer and inner coupling members may be of a design in which at least one of said outer coupling member, said inner coupling member and said drive transmitting member has a carbonitrided layer and, at the same time, a hydrogen content equal to or smaller than 0.5 ppm.

According to this aspect of the present invention, embrittlement of the steel resulting from the presence of hydrogen can be lessened. If the hydrogen content in the steel exceeds 0.5 ppm, the resistance of the steel to cracking tends to be lowered and the steel having such a low resistance to cracking can no longer be employed as a material for the constant velocity universal joint that is operated under a severe load. Accordingly, the lower the hydrogen content, the better. However, a relatively large length of heating time is required to reduce the hydrogen content down to a value smaller than 0.3 ppm and the heating for a prolonged length of time would result in a coarse austenite grain size, accompanied by reduction in toughness. Accordingly, the hydrogen content is preferably within the range of 0.3 to 0.5 ppm, more preferably within the range of 0.35 to 0.45 ppm, so that the constant velocity universal joint having an excellent resistance to cracking, dimensional stability and rolling fatigue life can be obtained.

It is to be noted that with respect to the hydrogen content, diffusion hydrogen is not taken into consideration during measurement of the hydrogen content, but only non-diffusion hydrogen that is emitted from the steel when the latter is heated to a predetermined temperature or higher is taken into consideration during the hydrogen content measurement. Since if a sample is of a small size, diffusion hydrogen will be emitted from the sample and eventually diminishes even at normal temperatures, the diffusion hydrogen is not dealt as a measuring object. On the other hand, the non-diffusion hydrogen is trapped in, for example, in a defective part of the steel and is emitted from the sample when heated to the predetermined temperature or higher. It is, however, to be noted that even though the measuring object is limited to the non-diffusion hydrogen as discussed above, the hydrogen content varies considerably depending on the method of measurement. Accordingly, the hydrogen content within the context of the present invention is obtained by a method based on the heat conductivity. As will become clear from the description made later, the hydrogen content is preferred to be measured by the use of a commercially available hydrogen analyzer tradenamed "DH-103" manufactured by and available from LECO Corporation, or its equivalent measuring apparatus.

In a preferred embodiment of the present invention, the constant velocity universal joint may be of a tripod type. In the constant velocity universal joint of the tripod type, the outer coupling member has an inner peripheral surface formed with an axially extending track groove defined at three locations in a circumferential direction thereof and also has roller guide faces defined on respective sides of the track groove, and the inner coupling member is comprised of a tripod member having bearing shanks formed at three locations in a circumferential direction thereof so as to protrude radially outwardly therefrom. The drive transmitting member used therein includes a roller rotatably mounted on the corresponding bearing shank through a plurality of needle rollers and operatively accommodated within the corresponding track groove in the outer coupling member, with an outer peripheral surface of said roller being guided by the roller guide faces.

The tripod type constant velocity universal joint is generally used as means for transmitting a rotatory drive from, for example, an automotive engine to a vehicle wheel and is usually operated under severe conditions. Because of this, advantageous features of the present invention, including a high resistance to cracking, a high dimensional stability and a high rolling fatigue life can be highlighted particularly when the constant velocity universal joint of the present invention is employed in an environment in which it tends to be operated under severe conditions.

Alternatively, the constant velocity universal joint of the tripod type may have the following structure. Namely, the outer coupling member has three track grooves, each of said track grooves being delimited by roller guide faces defined on respective sides of the corresponding track grooves so as to confront with each other in a direction circumferentially thereof, and the inner coupling member is comprised of a tripod member having three bearing shanks each extending radially outwardly therefrom. The drive transmitting member includes a roller rotatably inserted in each of the track grooves, and a ring mounted on each of the bearing shanks for rotatably supporting the corresponding roller, said roller being movable in a direction axially of the outer coupling member along the associated roller guide faces.

It is, however, to be noted that the inner peripheral surface of each ring may be formed so as to have an arcuately protruding sectional shape and, on the other hand, the outer peripheral surface of respective bearing shank may be formed so as to have a straight shape in its longitudinal section and also so as to have a cross-sectional shape effective to allow it to contact the inner peripheral surface of the associated ring in a direction perpendicular to the longitudinal axis of the universal joint and to form a gap between it and the inner peripheral surface of the associated ring in a direction axially of the universal joint.

Even this constant velocity universal joint can have a high resistance to cracking, a high dimensional stability and a high rolling fatigue life, all of those features being afforded by the present invention.

The present invention also provides a method of manufacturing a constant velocity universal joint including an outer coupling member, an inner coupling member, and a drive-transmitting member operatively interposed between the outer and inner coupling members. According to this method, at least one of the outer coupling member, the inner coupling member and the drive transmitting member is manufactured by, after steel has been subjected to a carbonitriding treatment at a carbonitriding temperature in excess of an $A_1$ transformation point, cooling the steel down to a temperature lower than the $A_1$ transformation point, and subsequently hardening by reheating the steel to a temperature higher than the $A_1$ transformation point and lower than the carbonitriding temperature and cooling the steel.

With this method of manufacturing the constant velocity universal joint according to the present invention, since the final hardening is carried out after subsequent to the carbonitriding treatment the steel material has been cooled down to the temperature not exceeding the $A_1$ transformation point, the austenite grain can advantageously be made fine. As a result of this, the Charpy impact value, the fracture toughness, the resistance to cracking and the rolling fatigue life can advantageously be increased.

Also, by cooling the steel down to, for example, a temperature at which the austenite transforms, it is possible to render the austenite grain boundary during the carbonitriding treatment to be irrelevant to the austenite grain boundary during the final hardening treatment. In addition, since the heating temperature used during the final hardening is lower than the heating temperature used during the carbonitriding treatment, the amount of non-dissolved cementite in the surface region that is subjected to the carbonitriding treatment can increase to a value predominant during the carbonitriding treatment. Because of this, at the final heating temperature in the final hardening, the proportion of the amount of the non-dissolved cementite increases and the proportion of the amount of the austenite decreases, as compared with those during the carbonitriding treatment. Also, considering the iron-carbon binary condition diagram, in the coexistent region of the cementite and the austenite, the concentration of carbon dissolved into the austenite decreases with lowering of the hardening temperature.

Since at the time the final heating temperature is attained the amount of the non-dissolved cementite, which hampers the growth of the austenite grain, is large and, therefore, the austenite grain becomes fine. In addition, the structure, which transformed from austenite to martensite and/or bainite, has a low carbon concentration and, therefore, as compared with the structure, which has been hardened from a carbonitriding temperature, such structure can represent a structure having a high toughness.

In the practice of the method of the present invention, the heating temperature during the reheating is preferably within the range of 790 to 830° C. Selection of the heating temperature within the range of 790 to 830° C. is advantageous in that since the hardening or quenching is carried out after having been reheated to a temperature at which the growth of austenite grain occurs hardly, the austenite grain can be made fine.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Preferred embodiments of the present invention will now be described with reference to the accompanying drawings.

First Embodiment

Figure 1:
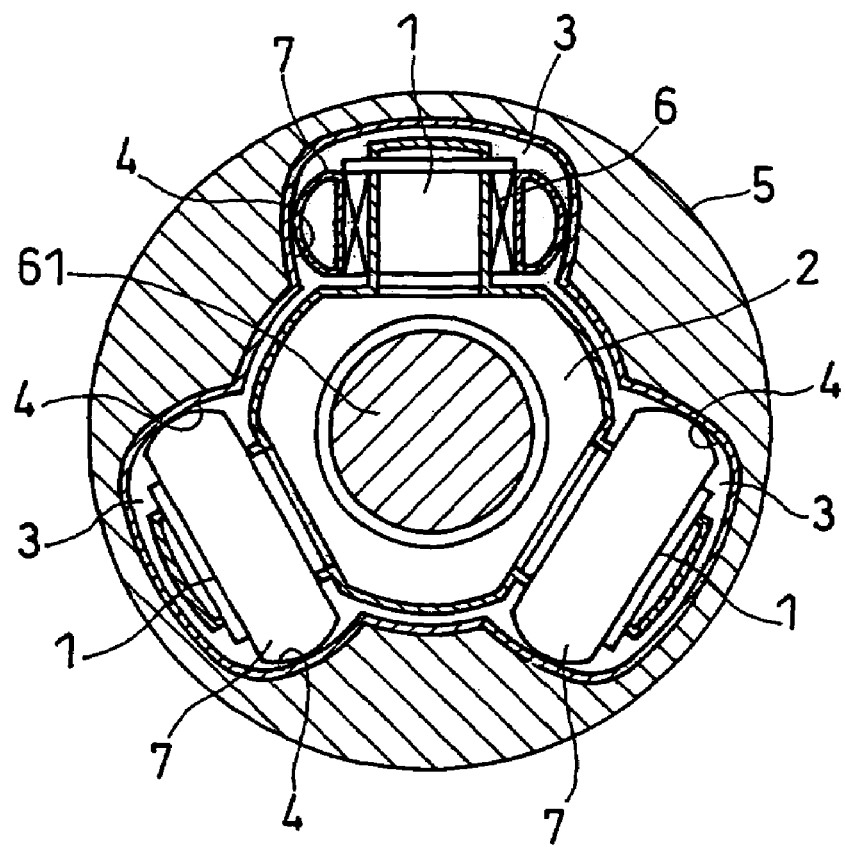
FIG. 1 is a transverse sectional view showing a constant velocity universal joint according to a first preferred embodiment of the present invention.
Figure 2:
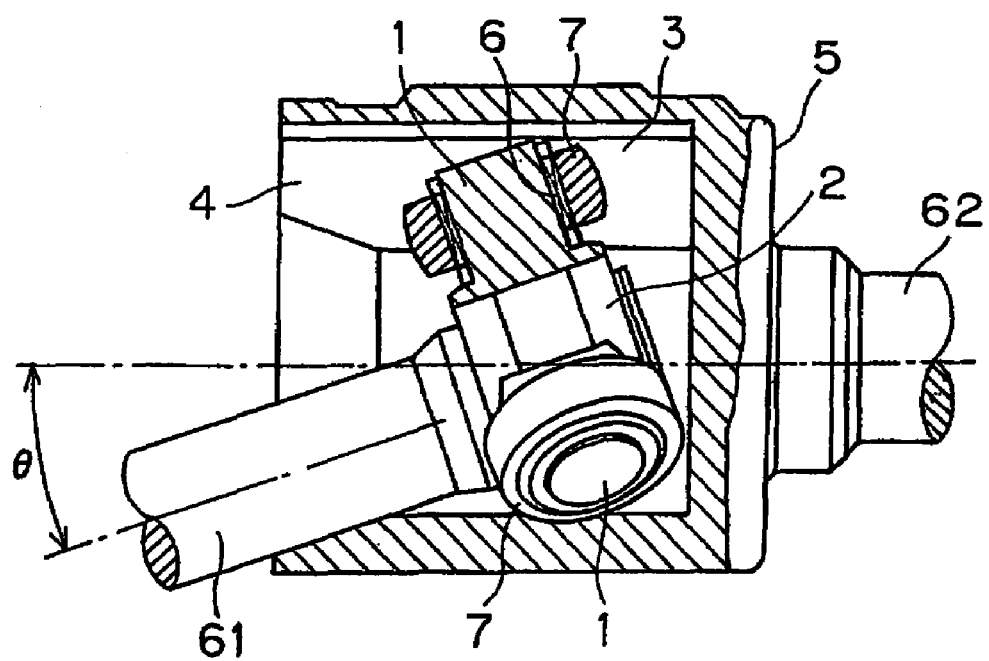
FIG. 2 is a longitudinal sectional view of the constant velocity universal joint shown in FIG. 1.
Figure 3:
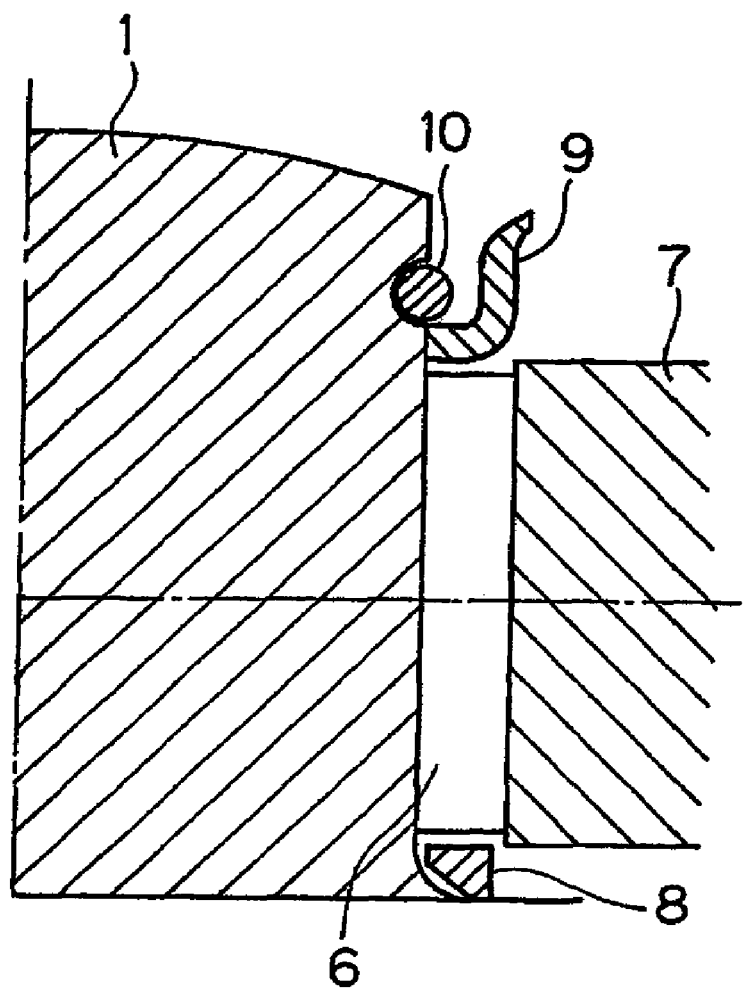
FIG. 3 is a fragmentary sectional view, on an enlarged scale, of a portion of the constant velocity universal joint shown in FIG. 1.

Specifically, FIGS. 1 to 3 illustrate a constant velocity universal joint according to a first preferred embodiment of the present invention. The constant velocity universal joint shown therein is of a tripod type and includes, as its principal component parts, a tripod member 2, which is an inner coupling member having three bearing shanks 1 protruding radially outwardly therefrom, an outer coupling member 5 having an inner peripheral portion thereof formed with three axially extending track grooves 3 and also having an axially extending roller guide face 4 defined on each side of each of the track grooves 3, and a roller 7, which is a drive transmitting member mounted on each of the bearing shanks 1 of the tripod member 2 through a plurality of needle rollers 6 and accommodated within the respective track grooves 3 in the outer coupling member 5. The constant velocity universal joint of the structure described above is so designed that the rollers 7 rotatably mounted on the respective bearing shanks 1 can have their outer peripheral surfaces guided by and in contact with the roller guide faces 4.

The tripod member 2 is mounted on one end of a shaft 61 for rotation together therewith, but axially non-displaceable relative to the shaft 61. For this purpose, the tripod member 2 is fixedly mounted on the shaft 61 by means of a serrated or splined engagement. The needle rollers 6 rollingly mounted on an outer peripheral surface of each of the bearing shanks 1 of the tripod member 2 is, as best shown in FIG. 3, constrained from moving in a direction axially of the corresponding bearing shank 1, by means of washers 8 and 9 mounted on base and free ends of such bearing shank 1 and a stop ring 10 mounted on the free end of such bearing shanks 1. The outer peripheral surface of each of the bearing shanks 1 of the tripod member 2 represents a cylindrical surface, with the respective rollers 7 rotatably mounted on such cylindrical surface of the corresponding bearing shanks 1 through the associated needle rollers 6.

The outer coupling member 5 is of a generally cylindrical cup-like configuration open at one end and closed at the other end, with an axle 62 formed integrally with the closed end thereof. The track grooves 3 defined in the inner peripheral surface of the outer coupling member 5 are spaced an equal angle of 120° from each other about the longitudinal axis thereof. Each of the track grooves 3 has its opposite sides defining the respective roller guide faces 4, which are formed in a Gothic arch shape having two centers of curvature so that the roller 7 can angularly contact the roller guide faces 4 at two points.

The tripod type constant velocity universal joint of the structure described above is operable to transmit the rotary drive from the axle 62 to the shaft 61 (or from the shaft 61 to the axle 62 depending on the application in which the constant velocity universal joint is employed) through driving engagement between the rollers 7 on the tripod member 2 and the roller guide faces 4 in the outer coupling member 5. Plunging of one of the inner coupling member, that is, the tripod member 2 and the outer coupling member 5 relative to the other of them can be accommodated as the rollers 7 on the tripod member 2 moves axially relative to the corresponding roller guide faces 4 within the respective track grooves 3.

Where the longitudinal axis of the outer coupling member 5 is held in alignment with the longitudinal axis of the tripod member 2, that is, during transmission of the rotatory drive at the zero operating angle θ, the point of intersection between the respective longitudinal axes of the bearing shanks 1 lie on the longitudinal axis of the outer coupling member 5 and, therefore, the rollers 7 rotate about the longitudinal axis of the outer coupling member 5 while being kept in contact with the roller guide faces 4 at two points opposite to each other. On the other hand, where the longitudinal axis of the tripod member 2 is inclined relative to that of the outer coupling member 5, that is, during transmission of the rotatory drive at a certain operating angle θ, the magnitude of forces of contact between each of the rollers 7 and the associated roller guide faces 4 may vary depending on the phase of rotation, but the contact at the two points at all times allow the constant velocity universal joint of the present invention to work in a stabilized fashion.

In the illustrated embodiment, at least one of the outer coupling member 5, the tripod member 2 that is the inner coupling member, and the rollers 7 forming a part of a drive transmitting member, all of which are component parts forming the constant velocity universal joint of the present invention, has a carbonitrided layer and, at the same time, an austenite grain size greater than the grade of No. 10.

Also, in the illustrated embodiment, at least one of the outer coupling member 5, the tripod member 2 and the rollers 7 has a carbonitrided layer and, at the same time, a breaking unit stress of not lower than 2,650 MPa.

Yet, in the illustrated embodiment, at least one of the outer coupling member 5, the tripod member 2 and the rollers 7 has a carbonitrided layer and, at the same time, a hydrogen content of not larger than 0.5 ppm.

Hereinafter, a heat treatment including a carbonitriding treatment that is effected to at least one of the outer coupling member 5, the tripod member 2 and the rollers 7 will be discussed.

Figure 4:
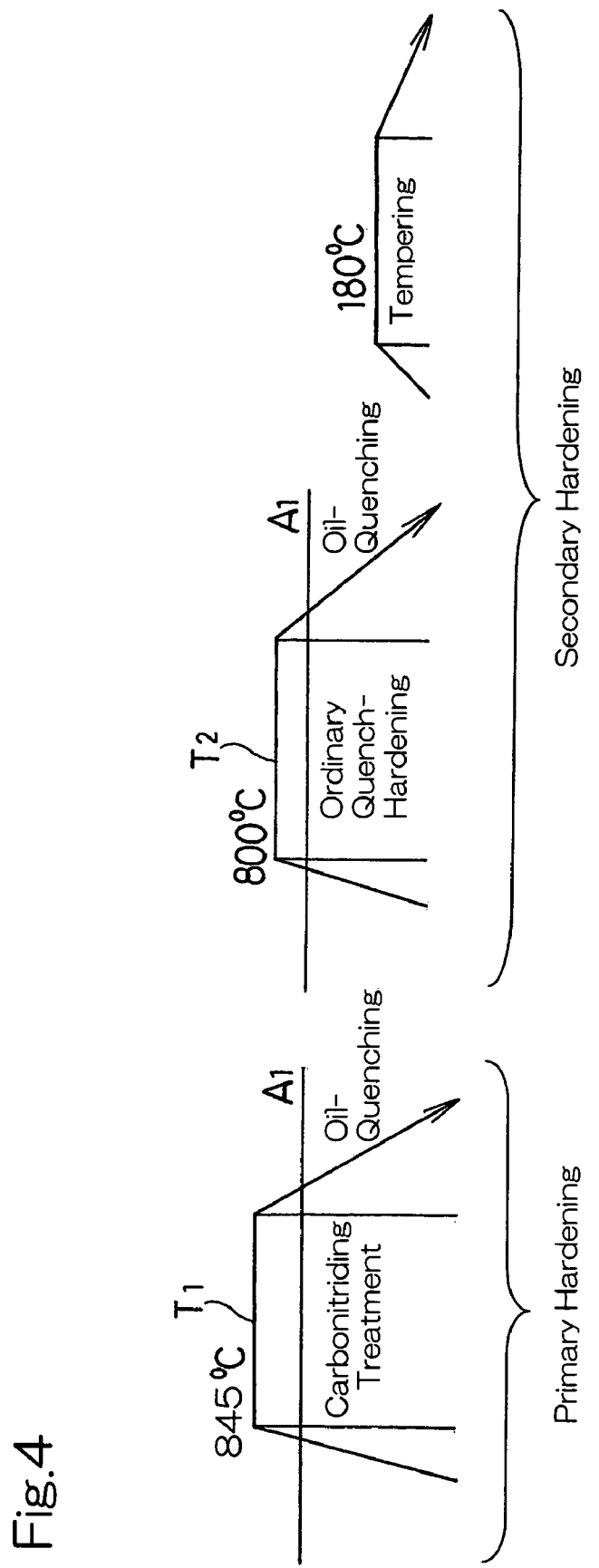
FIG. 4 is an explanatory diagram showing a method of heat treatment according to the first embodiment of the present invention.
Figure 5:
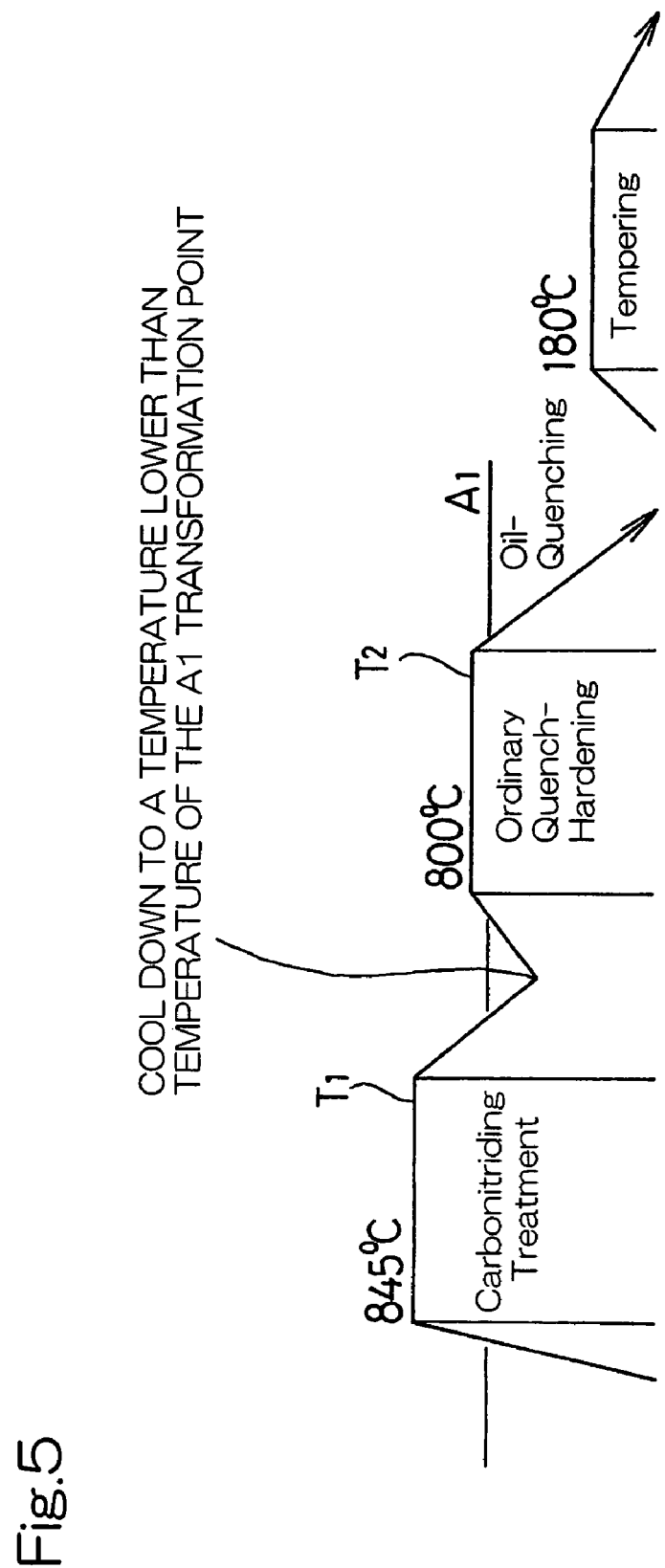
FIG. 5 is an explanatory diagram showing a modified form of the heat treatment method according to the first embodiment of the present invention.

FIG. 4 illustrates an explanatory diagram showing the heat treatment according to the first preferred embodiment of the present invention and, on the other hand, FIG. 5 illustrates an explanatory diagram showing a modified method of heat treatment according to the first embodiment of the present invention. Specifically, FIG. 4 illustrates a heat treating pattern for carrying out primary and secondary hardening, whereas FIG. 5 illustrates a heat treating pattern showing a method in which the material being hardened is cooled to a temperature not higher than the temperature of the $A_1$ transformation point and is subsequently hardened by reheating and cooling or quenching. The both are illustrative of the method of manufacturing the constant velocity universal joint according to the present invention.

In those figures, in the practice of the treatment $T_1$, after carbon and nitride have been diffused into the matrix of steel and penetration of carbon has been achieved sufficiently, the steel material is cooled down to a temperature not higher than the temperature of the $A_1$ transformation point. Thereafter, during the treatment T2 as shown, the steel material is reheated at a lower temperature than that during the treatment T1, followed by oil quenching.

The foregoing heat treatment is effective to increase the resistance to cracking and, also, to reduce the secular change in dimension while facilitating carbonitriding of a surface region of the material, as compared with an ordinary quench-hardening, that is, a process in which the carbonitriding treatment is immediately followed by a single quench-hardening. With the foregoing heat treatment, a microstructure in which the austenite grain size is of a value smaller than half the conventional austenite grain size can be obtained. Accordingly, by applying the foregoing heat treatment to the constant velocity universal joint in the illustrated embodiment, the constant velocity universal joint can advantageously have a long lifetime with minimized rolling fatigue, an increased resistance to cracking and a reduced secular change in dimension.

It is to be noted that where only the hydrogen content is to be included within the scope of the present invention, it is not necessary to choose the secondary hardening temperature, i.e., the temperature $T_2$, which is lower than the heating temperature $T_1$ (the primary hardening or heating temperature) for the carbonitriding treatment and the secondary hardening or heating temperature $T_2$ may be equal to or higher than the primary hardening temperature $T_1$. In other words, even if the temperature $T_2$ is higher than the temperature $T_1$, the hydrogen content can fall within the scope of the present invention. However, by choosing the secondary hardening temperature that is lower than the primary hardening temperature, not only can the hydrogen content be reduced, but also the austenite grain size can be equal to or greater than the grade of No. 10. Accordingly, it is desirable that the temperature $T_2$ is lower than the temperature $T_1$.

Figure 6A:
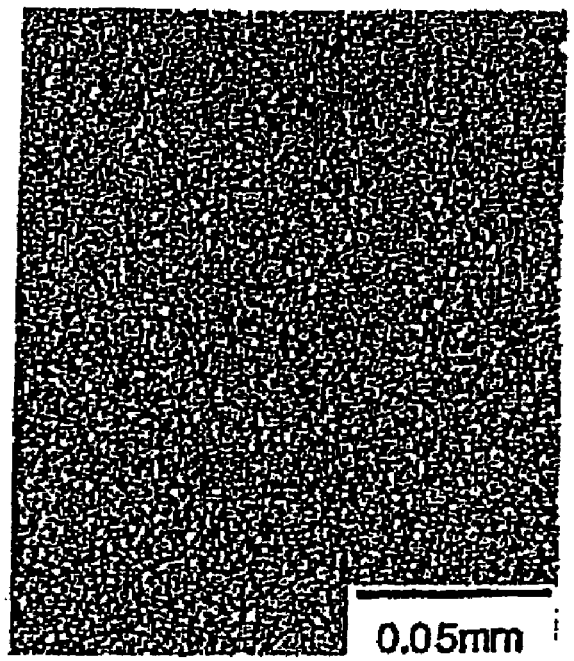
FIG. 6A is a diagram showing a microstructure, particularly an austenite grain in a component part of the constant velocity universal joint according to the present invention.
Figure 6B:
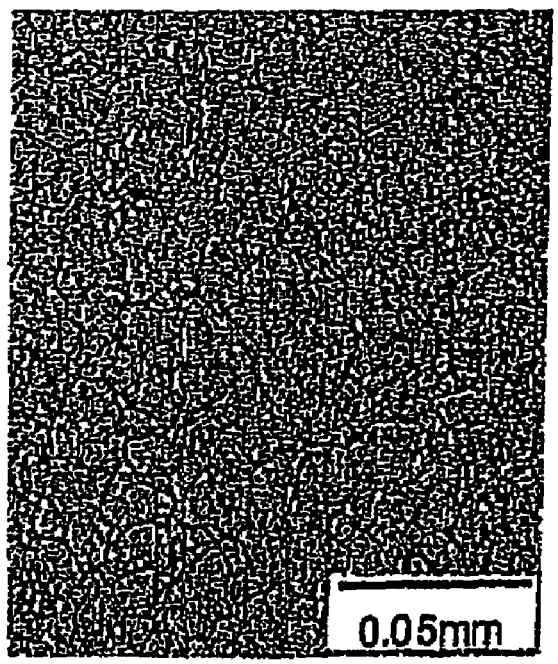
FIG. 6B is a diagram showing a microstructure, particularly an austenite grain in a component part of the conventional constant velocity universal joint.

FIGS. 6A and 6B illustrates microstructures of a component part of the constant velocity universal joint, particularly those of austenite grains. Specifically, FIG. 6A illustrates the microstructure of a component part of the constant velocity universal joint according to the present invention, whereas FIG. 6B illustrates that of the conventional constant velocity universal joint. The austenite grain size of the bearing steel to which the heat treatment pattern shown in FIG. 4 has been applied is shown in FIG. 6A and, for comparison purpose, the austenite grain size of the bearing steel treated in accordance with the conventional heat treatment method is shown in FIG. 6B.

Figure 7A:
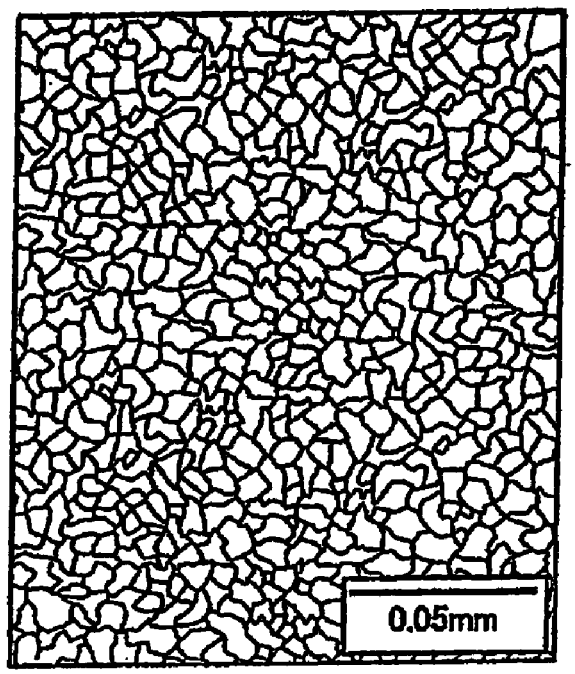
FIG. 7A is a diagram showing the austenite boundary illustrated in FIG. 6A.
Figure 7B:
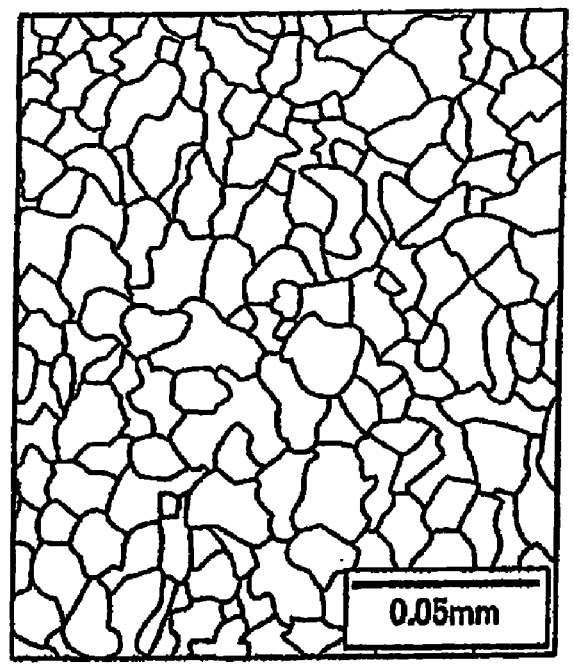
FIG. 7B is a diagram showing the austenite boundary illustrated in FIG. 6B.

FIGS. 7A and 7B are illustrations of the austenite grain boundaries drawn from the microstructures shown in FIGS. 6A and 6B, respectively. Because of the structures representing those austenite grain sizes, the austenite grain size found in the bearing steel treated according to the conventional heat treatment method is equal to the grade of No. 10 in terms of the grain size rating according to ISO 643 (International Organization for Standardization 643), whereas the heat treatment performed in accordance with the present invention is effective to provide the austenite grain size graded No. 12. It is to be noted that the average grain size of the austenite structure shown in FIG. 6A was 5.6 μm when measured in accordance with the microtomic method.

Although ISO 643 is utilized to determine austenite grain size, JIS G0551 (Japanese Industrial Standards G0551) or any other standard in conformance with the international standard may be utilized.

Second Embodiment

Figure 8A:
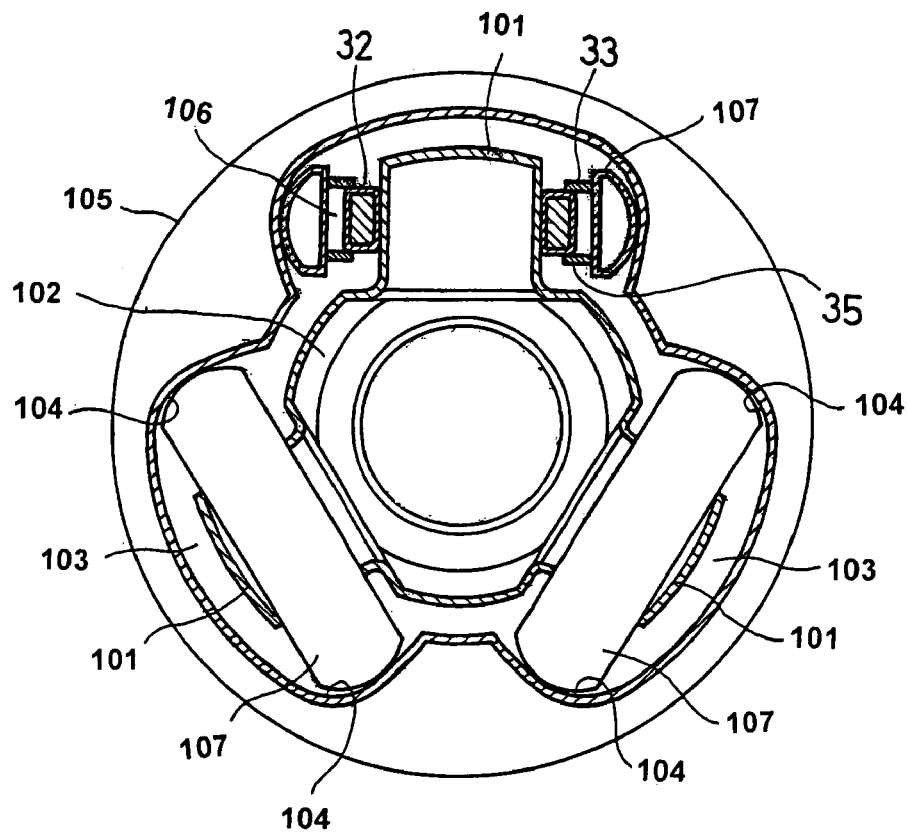
FIG. 8A is a schematic sectional view of the constant velocity universal joint according to a second preferred embodiment of the present invention.
Figure 8B:
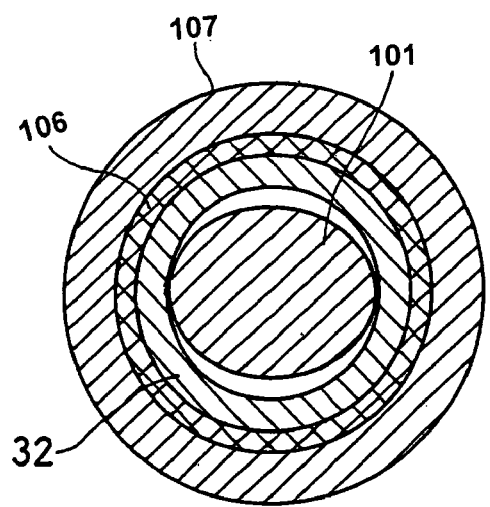
FIG. 8B is a sectional view showing the relation between one of bearing shanks and a roller assembly of the constant velocity universal joint shown in FIG. 8A, which is taken along a line conforming to the longitudinal axis of the bearing shank.
Figure 8C:
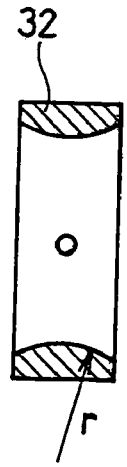
FIG. 8C is a sectional view of the ring shown in FIG. 8B.
Figure 9A:
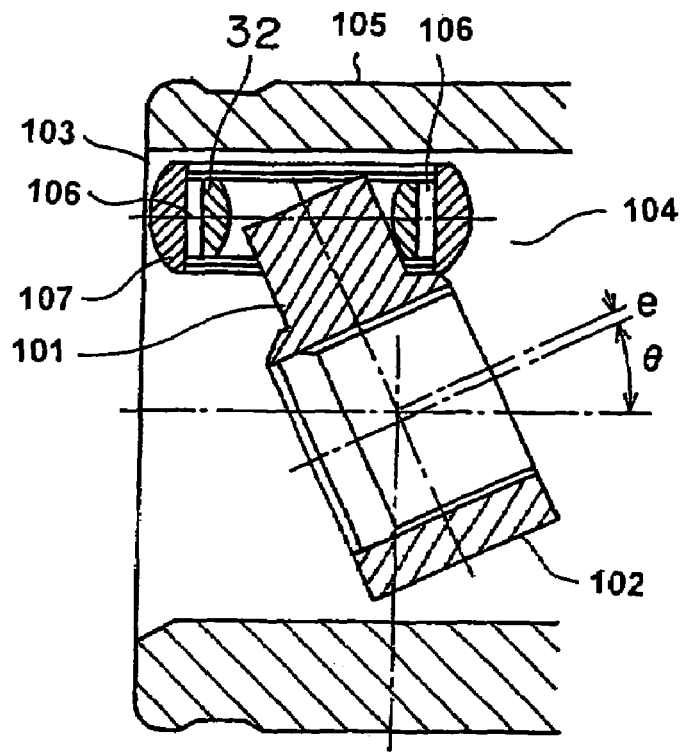
FIG. 9A is a longitudinal sectional view of the constant velocity universal joint according to the second embodiment of the present invention, showing the universal joint assuming a certain working angle.
Figure 9B:
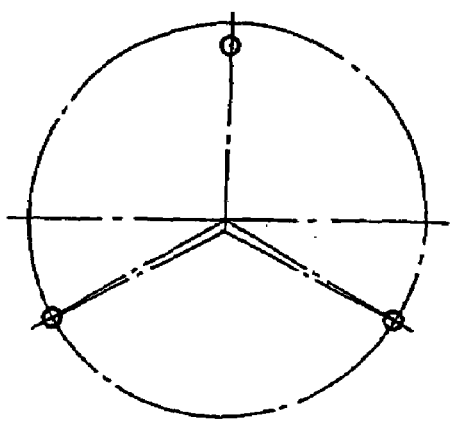
FIG. 9B is a schematic front view of a tripod member used in the constant velocity universal joint according to the second embodiment of the present invention.

FIGS. 8A to 9B illustrate the constant velocity universal joint according to a second preferred embodiment of the present invention. Specifically, FIG. 8A is a transverse sectional view of the constant velocity universal joint, FIG. 8B is a sectional view of each of the bearing shanks and FIG. 9A illustrates an operative condition of the constant velocity universal joint when operated at a certain operating angle θ, and FIG. 9B is a schematic front view of a tripod member used in the constant velocity universal joint according to FIG. 9A. As shown in FIGS. 8A to 8C, the constant velocity universal joint includes an outer coupling member 105, a tripod member 102, which is an inner coupling member, and a roller 107, which is a drive transmitting member interposed between the outer coupling member 105 and the tripod member 102. One of shafts that are to be drivingly coupled with each other through the constant velocity universal joint is fixedly coupled with the outer coupling member 105 and the other of the shafts is fixedly coupled with the tripod member 102.

The outer coupling member 105 has an inner peripheral portion thereof formed with three axially extending track grooves 103 and also having an axially extending roller guide face 104 defined on each side of each of the track grooves 103. The tripod member 102 has three bearing shanks 101 protruding radially outwardly therefrom, with the roller 107 rotatably mounted on each of those bearing shanks 101. The roller 107 on each of the bearing shanks 101 is accommodated within the respective track groove 103 in the outer coupling member 105 and has its outer peripheral surface curved to follow the curvature of the respective roller guide faces 104.

The roller guide faces 104 have a sectional shape representing a Gothic arch shape so that the roller 107 can angularly contact the roller guide faces 104. The line of action passing across the points of contact of those two is shown by the single-dotted line in FIG. 8A. It is to be noted that the angular contact can occur between the rollers 107 and the roller guide faces 104 even though the roller guide faces 104 have a tapered sectional shape while the outer peripheral surface of each of the rollers 107 represents a spherical shape. Accordingly, the use of the structure in which the angular contact takes place between the rollers 107 and the roller guide faces 104 is effective to facilitate stabilization in position since the rollers 107 will hardly undergo any rocking motion. It is, however, to be noted that where no angular contact is employed, the roller guide faces 104 may be of a shape having its longitudinal axis occupying, for example, a portion of the cylindrical surface that is parallel to the longitudinal axis of the outer coupling member 105, with its sectional shape representing an arcuate shape following the generatrix of the outer peripheral surface of the rollers 107.

A ring 32 is mounted on an outer peripheral surface of each of the bearing shanks 101. This ring 32 cooperates with the roller 107 to define a drive-transmitting member and the both are unitized together through a plurality of needle rollers 106 to thereby define a relatively rotatable roller assembly. In other words, assuming that the cylindrical outer peripheral surface of the ring 32 is an inner raceway and the cylindrical inner peripheral surface of each of the rollers 107 is an outer raceway, the needle rollers 106 are rollingly interposed between the inner and outer raceways. As shown in FIG. 8B, each of the needle rollers 106 are employed in a number as many as possible and are accommodated in a full type fashion with no roller retainer employed.

Reference numerals 33 and 35 represent respective washers mounted in annular grooves defined in the inner peripheral surface of each of the rollers 107 for avoiding separation of the needle rollers 106. Each of those washers 33 and 35 has a single split (not shown) in its circumference so that the respective washers 33 and 35 can be resiliently clipped into the annular groove in the inner peripheral surface of each roller 107.

The outer peripheral surface of each of the bearing shank 101, when viewed in a longitudinal sectional view (FIG. 9A), represents a straight shape parallel to the longitudinal axis of the bearing shank 101, but when viewed in a transverse sectional view (FIG. 8B), represents an elliptical shape having its long axis lying perpendicular to the longitudinal axis of the universal joint. Each of the bearing shanks 101 has a sectional shape representing a generally elliptical shape defined by reducing the wall thickness of the tripod member 102 as viewed in a direction conforming to the longitudinal axis thereof. In other words, each of the bearing shanks 101 has a sectional shape that is defined by setting opposite portions of the outer peripheral surface thereof, that are opposite to each other with respect to the longitudinal axis thereof, backwards from the imaginary cylindrical surface in respective directions counter to each other.

Each of the rings 32 has an inner peripheral surface of a section representing an arcuate shape protruding radially inwardly thereof as best shown in FIG. 8C, with the generatrix of the inner peripheral surface thereof represented by a radius r of curvature. In view of the fact that the inner peripheral surface of each of the rings 32 represents an arcuate shape as discussed above and, also, each of the bearing shanks 101 has a transverse sectional shape representing a generally elliptical shape, as discussed above, with predetermined gaps left between the respective bearing shank 101 and the associated rings 32, each of the rings 32 is not only displaceable in a direction conforming to the longitudinal axis of the associated bearing shank 101, but also capable of swiveling relative to the associated bearing shank 101. Also, since each of the rings 32 and the associated roller 107 are unitized together through the needle rollers 106 to define the relatively rotatable assembly as hereinbefore described, the unit of each rings 32 and the associated roller 107 can undergo a rocking motion. The swiveling motion referred to herein is intended to speak of inclination of a common axis of the rings 32 and the associated roller 107 relative to the longitudinal axis of the associated bearing shank 101 within a plane containing the longitudinal axis of the bearing shank 101. See FIG. 9A.

In the case of this type of the conventional tripod type constant velocity universal joint, each of the bearing shanks has its entire outer peripheral surface held in contact with the inner peripheral surface of the associated ring and, therefore, the ellipse of contact represents a generally laterally elongated shape extending in a circumferential direction. Because of this, when each of the conventional bearing shanks inclines relative to the outer coupling member, a frictional moment can be generated, which cause the associated ring and, hence, the associated roller to incline in unison with movement of the respective bearing shanks.

In contrast thereto, in the case of the constant velocity universal joint according to the embodiment shown in FIGS. 8A to 9B and now under discussion, since each of the bearing shanks 101 has a transverse section representing a generally elliptical shape and, on the other hand, each of the rings 32 has an inner peripheral surface representing a cylindrical sectional shape, the ellipse of contact between the respective bearing shank 101 and the associated ring 32 as shown by the dotted line in FIG. 8C will come to represent nearly a point of contact, accompanied by reduction of the surface area of contact. Accordingly, as compared with that found in the conventional constant velocity universal joint, the force necessary to incline the roller assembly can be reduced considerably, resulting in an increased stability in position of the rollers 107.

Also, in the case of the conventional constant velocity universal joint, points of contact between the bearing shanks and the respective rings tends to displace below a location intermediate of the width of each of the rings when the swiveling angle is zero. As a result thereof, the needle rollers used therein may exhibit an unstable behavior, failing to roll stably.

In contrast thereto, with the constant velocity universal joint according to the embodiment shown in FIGS. 8A to 9B, since the points of contact between the bearing shanks 101 and the inner peripheral surfaces of the rings 32 lies at a location intermediate of the width of each of the rings 32 and, therefore, the needle rollers 106 can undergo a rolling motion stably.

In the practice of the foregoing embodiment shown in and described with reference to FIGS. 8A to 9B, at least one of the outer coupling member 105, the tripod member 102 forming the inner coupling member, the rollers 107 forming respective parts of the drive transmitting member, and rings forming different parts of the drive transmitting member has a carbonitrided layer formed therein with its austenite grain size being greater than the grade of No. 10. It is to be noted that according to one embodiment, only one of the rollers 107 and the rings 32, both forming respective parts of the drive transmitting member, may have a carbonitrided layer referred to above, with its austenite grain size greater than the grade of No. 10. In other words, in such an embodiment, either the rollers 107 or the rings 32 may have a carbonitrided layer referred to above.

Also, in the practice of the foregoing embodiment shown in and described with reference to FIGS. 8A to 9B, at least one of the outer coupling member 105, the tripod member 102, the rollers 107 and the rings 32 may have a carbonitrided layer and, at the same time, a breaking unit stress of not lower than 2,650 MPa.

Yet, in the practice of the foregoing embodiment shown in and described with reference to FIGS. 8A to 9B, at least one of the outer coupling member 105, the tripod member 102, the rollers 107 and the rings 32 may have a carbonitrided layer and, at the same time, a hydrogen content of not larger than 0.5 ppm. According to one embodiment, only one of the rollers 107 and the rings 32 may have hydrogen content of not higher than 0.5 ppm. In other words, in such an embodiment, either the rollers 107 or the rings 32 may have a hydrogen content of not higher than 0.5 ppm.

Third Embodiment

Figure 10:
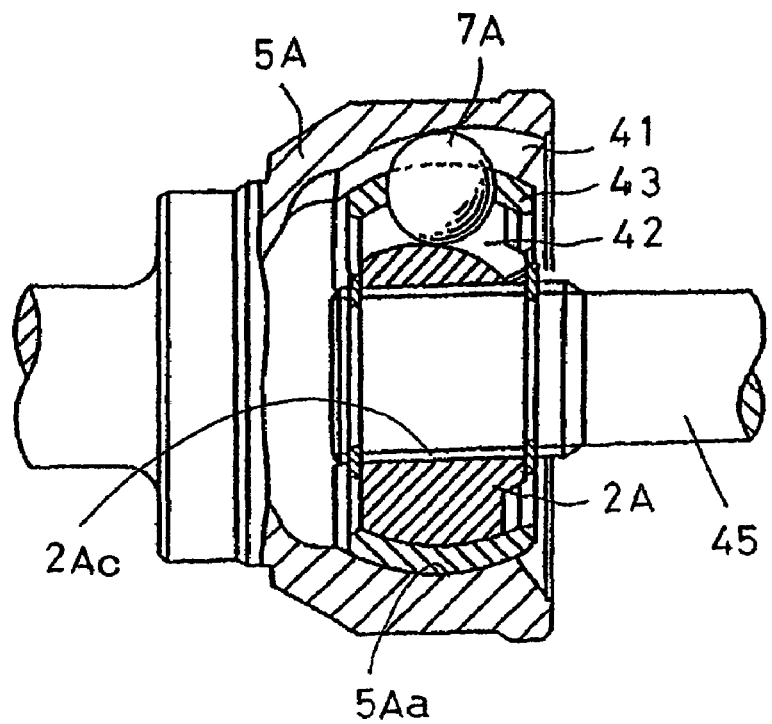
FIG. 10 is a longitudinal sectional view of the constant velocity universal joint according to a third preferred embodiment of the present invention.
Figure 11:
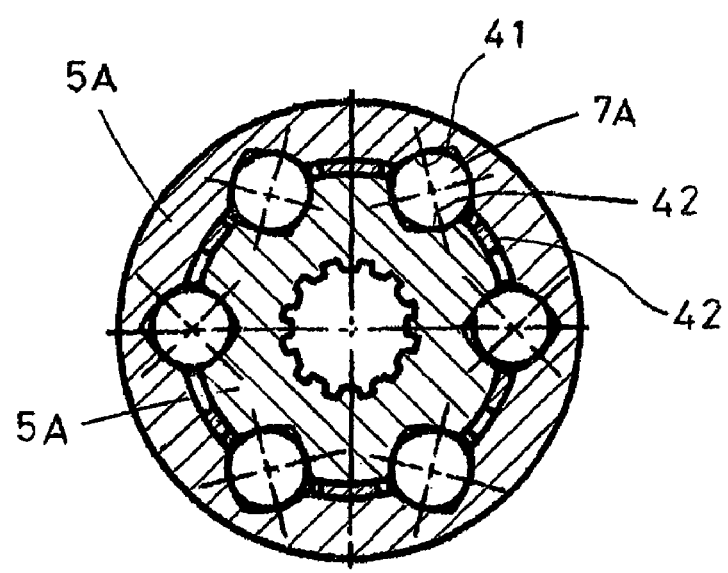
FIG. 11 is a transverse sectional view of the constant velocity universal joint shown in FIG. 10.

The constant velocity universal joint according to a third preferred embodiment of the present invention is shown in FIGS. 10 and 11. The constant velocity universal joint shown therein is of a ball joint fixed type and includes an outer coupling member 5A, an inner coupling member 2A and a plurality of balls 7A rollingly interposed between the outer and inner coupling members 5A and 2A. The outer coupling member 5A is of a generally cup-like configuration having a substantially spherical inner peripheral surface 5Aa formed with a plurality of (for example, six or eight) axially extending and curved guide grooves 41 defined therein. The inner peripheral surface of this inner coupling member 2A is formed with a mounting portion 2Ac having serrations or spline keys.

The balls 7A are accommodated in corresponding ball tracks each defined by the respective guide groove 41 in the outer coupling member 5A and the respective guide groove 42 in the inner coupling member 2A aligned with such guide groove 41. Those balls 7 are received and retained in respective pockets of a ball retainer or case 43 that is disposed within a gap delimited between the inner coupling member 2A and the outer coupling member 5A. A drive shaft 45 has one end formed with serrations or spline grooves engageable with the serrations or spline keys in the mounting portion 2Ac of the inner coupling member 2A so that the drive shaft 45 can be splined to the inner coupling member 2A through the mounting portion 2Ac.

In the practice of this embodiment shown in and described with reference to FIGS. 10 and 11, at least one of the outer coupling member 5A, the inner coupling member 2A, and the balls 7A forming a part of the drive transmitting member, all of which are component parts of the constant velocity universal joint, has a carbonitrided layer with its austenite grain size greater than the grade of No. 10.

In the practice of this embodiment shown in and described with reference to FIGS. 10 and 11, at least one of the outer coupling member 5A, the inner coupling member 2A and the balls 7A may have a carbonitrided layer and, at the same time, a breaking unit stress of not lower than 2,650 MPa.

Hereinafter, the present invention will be demonstrated by way of examples that are only for illustration purpose and are not intended to limit the scope of the present invention.

EXAMPLE 1

Using SUJ2 material (1.0 wt % of C, 0.25 wt % of Si, 0.4 wt % of Mn and 1.5 wt % of Cr), the first embodiment of the present invention was carried out. Histories of manufacture of samples are tabulated in Table 1 below.

Samples A to D

EXAMPLES OF THE INVENTION

Carbonitriding treatment was performed at 850° C. for 150 minutes under the atmosphere containing a mixture of RX gas and ammonium gas. In the heat treatment pattern shown in FIG. 4, the carbonitriding treatment was carried out at 850° C., immediately followed by the primary hardening or quenching, then heating to a temperature range of 780 to 830° C. which was lower than the carbonitriding temperature, and finally the secondary quenching. It is, however, to be noted that the sample A subjected to the secondary quenching at the temperature of 780° C. was rejected from evaluation because of insufficient hardening.

Samples E and F

COMPARATIVE EXAMPLES

Carbonitriding treatment was carried in a manner similar to that applied to each of the samples A to D and the secondary hardening was carried out at a temperature within the range of 850 to 870° C. which is equal to or higher than the carbonitriding temperature of 850° C.

Conventional Carbonitrided Produce

COMPARATIVE EXAMPLE

Carbonitriding treatment was performed at 850° C. for 150 minutes under the atmosphere containing a mixture of RX gas and ammonium gas. The carbonitriding treatment was immediately followed by hardening. No secondary hardening treatment was carried out.

Ordinary Hardened Product

COMPARATIVE EXAMPLE

No carbonitriding treatment was carried out, but heating was instead carried out at 850° C. to achieve hardening. No secondary hardening treatment was carried out.

TABLE 1

| Samples | A | B | C | D | E | F | Conventional Carbonitrided Product | Ordinary Hardened Product |
|---|---|---|---|---|---|---|---|---|
| Secondary Hardening Temp. (° C.) | 780(*) | 800 | 815 | 830 | 850 | 870 | — | — |
| Amt of Hydrogen (ppm) | — | 0.37 | 0.40 | 0.38 | 0.42 | 0.40 | 0.72 | 0.38 |
| Grain Size (JIS) | — | 12 | 11.5 | 11 | 10 | 10 | 10 | 10 |
| Charpy Impact (J/cm$^2$) | — | 6.65 | 6.40 | 6.30 | 6.20 | 6.30 | 5.33 | 6.70 |
| Breaking Stress (Mpa) | — | 2840 | 2780 | 2650 | 2650 | 2700 | 2330 | 2770 |
| Rolling Fatigue Life Ratio ($L_{10}$) | — | 5.4 | 4.2 | 3.5 | 2.9 | 2.8 | 3.1 | 1 |

(*)In view of insufficient hardening, no evaluation is given this time.

With respect to each of those samples, measurement of the amount of hydrogen, measurement of the grain size, Charpy impact test, measurement of the braking stress and measurement of the rolling fatigue were conducted in the following manners.

I TEST METHODS IN THE FIRST EMBODIMENT (1) Measurement of the Amount of Hydrogen:

The amount of non-diffusion hydrogen contained in steel was analyzed by the use of a commercially available hydrogen analyzer tradenamed "DH-103" manufactured by and available from LECO Corporation. No amount of diffusion hydrogen was measured. The specification of this commercially available hydrogen analyzer is as follows:

| | |
|---|---|
| Analyzing Capability: | 0.01 to 50.00 ppm |
| Analyzing Accuracy: | ±0.1 ppm or 3% H (whichever higher) |
| Analyzing Sensitivity: | 0.01 ppm |
| Detecting System: | Heat Conductivity Scheme |
| Sample Weight & Size: | 10 mg to 35 gr. (12 mm in maximum Diameter and 100 mm in maximum length) |
| Heating Furnace Temp.: | 50 to 1,100° C. |
| Reagent: | ANHYDRONE $Mg(ClO_4)_2$ and LECOSURB NaOH |
| Carrier Gas: | Nitrogen gas, gas dosing gas and hydrogen gas (all of which have a purity of 99.99% or higher and were supplied under a pressure of 40 PSI (2.8 $kgf/cm^2$.) |

Measurement was carried out in the following manner. Each of the samples sampled by the use of a dedicated sampler was loaded into the hydrogen analyzer together with the sampler. The diffusion hydrogen contained therein was introduced into a heat conductivity detector by the aid of the nitrogen carrier gas. No amount of the diffusion hydrogen was measured in this embodiment.

Subsequently, the respective sample was removed from the sampler and heated within a resistance heating furnace, followed by introduction of the non-diffusion hydrogen into the heat conductivity detector by the aid of the nitrogen carrier gas. The amount of the non-diffusion hydrogen was calculated in terms of the heat conductivity measured by the heat conductivity detector.

(2) Measurement of Grain Size:

Measurement of the grain size was carried out based on a method of testing the austenite grain size in steel according to JIS G0551.

(3) Charpy Impact Test:

The Charpy impact test was carried out based on the Charpy impact test method for metallic material according to JIS Z2242. Each of the samples tested was in the form of a U-notched specimen (JIS No. 3 Specimen). The Charpy impact value is represented by the Charpy absorbed energy E divided by the sectional area (0.8 $cm^2$).

| | |
|---|---|
| Charpy absorbed energy: | E = WgR(cos β − cos α) |
| Wherein: | W: Hammer Weight (=25.438 kg) |
| | g: Gravitational Acceleration |
| | R: Distance from the center of rotation of the hammer to the center of gravity (=0.6569 m) |
| | α: Hammer lift angle (−146°) and |
| | β: Hammer bend-up angle |

Figure 12:
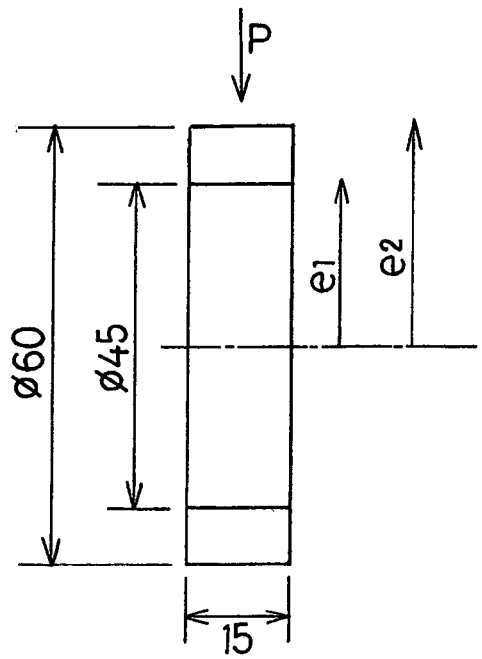
FIG. 12 is a schematic diagram showing a specimen used in a static pressure breaking strength test (measurement of the breaking stress)

(4) Measurement of Breaking Stress:

FIG. 12 illustrates a specimen used in a static pressure breaking strength test (measurement of the breaking stress). A load was applied to the specimen in a direction shown by P and the magnitude of such load required for the specimen to break up as a result of application of the load was measured. Subsequently, the breaking load obtained was converted into the stress value using the stress equation, shown below, for bent beams. It is to be noted that the specimen tested may not be limited to such a shape as shown in FIG. 12, but may have any other shape.

Assuming that the fiber stress at a protruding surface of the specimen is expressed by $\sigma_1$ and that at a recessed surface thereof is expressed by $\sigma_2$, the values $\sigma_1$ and $\sigma_2$ can be determined by the following equations. ((As will be appreciated by one of ordinary skill in the art, a more thorough explanation of these equations can be found, e.g., in Kikai Kougaku Binran A4, Henzairyo Rikigaku A4-40 (Handbook on Mechanical Engineering A4, Dynamics of Knitting Material A4-40).) In those equations, N represents the axial force of the section containing the axis of the round specimen, A represents the cross sectional surface area, $e_1$ represents the outer radius and $e_2$ represents the inner radius, and K represents the modulus of section of the bent beam.

$$\sigma_1 = (N/A) + \{M/(A\rho_0)\}[1 + e_1/\{\kappa(\rho_0 + e_1)\}]$$

$$\sigma_2 = (N/A) + \{M/(A\rho_0)\}[1 + e_2/\{\kappa(\rho_0 - e_2)\}]$$

$$\kappa = -(1/A)\int_A \{\eta/(\rho_0 + \eta))\} dA$$

Figure 13A:
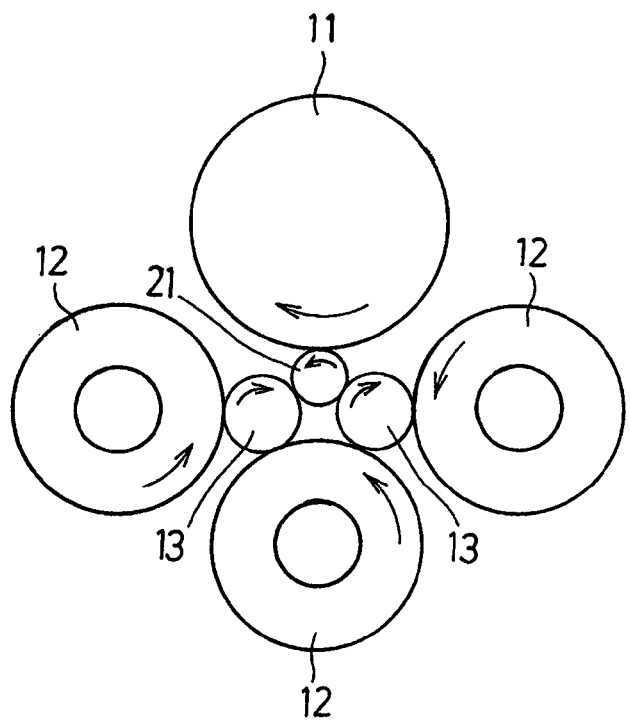
FIG. 13A is a schematic front elevational view of an apparatus for testing the rolling fatigue lifetime.
Figure 13B:
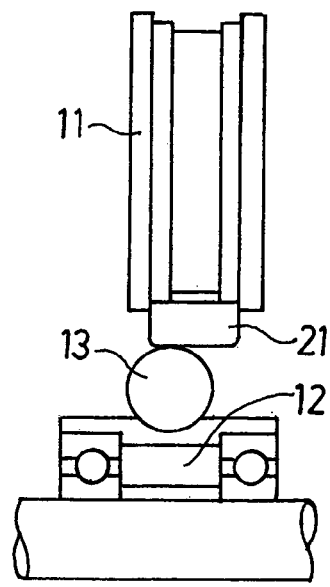
FIG. 13B is a schematic side view of the rolling fatigue lifetime testing apparatus shown in FIG. 13A.

(5) Rolling Fatigue Test:

Test conditions for the rolling fatigue lifetime test are shown in Table 2, whereas an apparatus for testing the rolling fatigue lifetime is shown in FIGS. 13A and 13B in a front elevational view and a side view, respectively.

Referring to FIGS. 13A and 13B, a specimen 21 to be tested as to the rolling fatigue lifetime is driven by a driving roll 11 to rotate in contact with balls 13. The balls 13 are in the form of a (¾)" ball and are, while guided by guide rolls 12, rolled while applying a bearing pressure to the specimen 21 being tested.

II TEST RESULTS IN THE FIRST EMBODIMENT (1) Amount of Hydrogen:

The conventional carbonitrided product as carbonitrided has exhibited the amount of hydrogen that is very high of 0.72 ppm. The reason therefore appears that ammonium ($NH_3$) contained in the carbonitriding atmosphere decomposed with hydrogen penetrating into the steel. In contrast thereto, the amount of hydrogen measured in the samples B to D has been found 0.37 to 0.40 ppm, which is almost half that in the conventional carbonitrided product. This amount of hydrogen in the samples B to D has fallen on the same level as that in the ordinary hardened product.

Because of the reduced amount of hydrogen discussed above, the possibility of steel becoming fragile as a result of solution of the hydrogen can be lessened. In other words, reduction in amount of hydrogen brings about improvement in Charpy impact value of the samples B to D pertaining to the present invention.

(2) Grain Size:

Where the secondary hardening or heating temperature is lower than the temperature (the primary hardening or heating temperature) at which hardening during the carbonitriding treatment is carried out, that is, in the case of the samples B to D, the austenite grains are considerably miniaturized to the grain size of No. 11 to No. 12 rating. The austenite grain in each of the samples E and F, the conventional carbonitrided product and the ordinary hardened product was rated No. 10 in grain size and is thus coarse as compared with that of the samples B to D pertaining to the present invention.

(3) Charpy Impact Test:

As shown in Table 1, while the Charpy impact value exhibited by the conventional carbonitrided product was 5.33 J/cm$^2$, the samples B to D pertaining to the present invention have exhibited the Charpy impact value ranging from 6.30 to 6.65 J/cm$^2$ which is higher than that exhibited by the conventional carbonitrided product. Of them, the tendency can be found that the lower the secondary hardening temperature, the higher the Charpy impact value. As regards the ordinary hardened product, the Charpy impact value exhibited thereby was 6.70 J/cm$^2$ that is higher than that exhibited by the conventional carbonitrided product and, also, those exhibited by the samples B to D.

(4) Measurement of the Breaking Stress:

The breaking stress value referred herein corresponds to the resistance to cracking. As shown in Table 1, while the breaking stress value of the conventional carbonitrided product was 2,330 MPa, the samples B to D pertaining to the present invention have shown the breaking stress value ranging from 2,650 to 2,840 MPa which was indeed improved over that of the carbonitrided product. The breaking stress value of the ordinary hardened product was 2,770 MPa which is comparable to those of the samples B to F. The resistance to cracking so exhibited by the samples B to D appears to have resulted from reduction in hydrogen content along with miniaturization of the austenite grain size.

(5) Rolling Fatigue Test

As shown in Table 1, because of the ordinary hardened product has no carbonitrided layer formed in a surface region thereof, the rolling fatigue lifetime L10 was the lowest of all. In contrast thereto, the conventional carbonitrided product has shown the rolling fatigue lifetime, which is 3.1 times that exhibited by the ordinary hardened product. However, the rolling fatigue lifetime exhibited by each of the samples B to D pertaining to the present invention has considerably increased to a value higher than that exhibited by the conventional carbonitrided product. On the other hand, the rolling fatigue lifetime exhibited by each of the samples E and F was found to be about equal to that exhibited by the conventional carbonitrided product.

Summarizing the foregoing test results, it is clear that in each of the samples B to D the hydrogen content has been reduced, the austenite grain has been miniaturized down to the grain size rated No. 11 or higher and improvement has been achieved in Charpy impact value, resistance to cracking and rolling fatigue lifetime.

EXAMPLE 2

Using the following materials X, Y and Z, a series of tests were conducted. Using SUJ2 material (1.0 wt % of C, 0.25 wt % of Si, 0.4 wt % of Mn and 1.5 wt % of Cr) for the materials to be heat treated, the materials X, Y and Z were commonly made of this material. Histories of manufacture of the materials X, Y and Z are as follows:

Material X (Comparative Example) Ordinarily hardened. Not subjected to the carbonitriding treatment.

Material Y (Comparative Example)

The carbonitriding treatment was immediately followed by hardening (conventional carbonitriding). Carbonitriding was carried out at 845° C. for 150 minutes under the carbonitriding atmosphere containing a mixture of RX gas and ammonium gas.

Material Z (Example of the Invention)

Bearing steel to which the heat treatment pattern shown in FIG. 5 was applied. Carbonitriding was carried out at 845° for 150 minutes under the carbonitriding atmosphere containing a mixture of RX gas and ammonium gas. The final hardening temperature was 800°.

(1) Rolling Fatigue Lifetime

Testing conditions and apparatus for determining the rolling fatigue lifetime are such as shown in Table 2 and in FIG. 13 and as described hereinabove. Results of the rolling fatigue lifetime test are shown in Table 3 below.

TABLE 2

| | |
|---|---|
| Specimen | Cylindrical specimen of 12 in diameter and 22 in length |
| No. of Specimen | 10 pieces |
| Counteracted Steel Ball | 3/4" (19.05 mm) |
| Contact Bearing Pressure | 5.88 Gpa |
| Loading Speed | 46,240 cpm |
| Lubricant | Turbine VG68 Forced Circulating Lubrication |

TABLE 3

| | Lifetime (Loaded Cycles) | | |
|---|---|---|---|
| Material | $L_{10}$ (×10$^4$ cycles) | $L_{10}$ (×10$^4$ cycles) | Ratio of $L_{10}$ |
| X | 8,017 | 18,648 | 1.0 |
| Y | 24,656 | 33,974 | 3.1 |
| Z | 43,244 | 69,031 | 5.4 |

As shown in Table 3, the material Y for comparison purpose has shown the lifetime which is 3.1 times the $L_{10}$ lifetime (the lifetime in which only one of the 10 specimens broke up) of the material X for comparison purpose which has been ordinarily hardened and has thus proven that carbonitriding treatment is effective to increase the lifetime. In contrast thereto, the material Z for the invention has shown the lifetime, which is 1.74 times that, exhibited by the material Y and 5.4 times that exhibited by the material X. A major cause of such improvement appears to have resulted from miniaturization of the microstructure.

(2) Charpy Impact Test

Using a U-notched specimen, the Charpy impact test was conducted according to JIS Z2244 in a manner similar to that described previously. Results of the test are shown in Table 4 below:

TABLE 4

| Material | Charpy Impact Value (J/cm$^2$) | Ratio of Impact Values |
|---|---|---|
| X | 6.7 | 1.0 |
| Y | 5.3 | 0.8 |
| Z | 6.7 | 1.0 |

Although the Charpy impact value exhibited by the material Y (for comparison) which was subjected to the carbonitriding treatment is not so high as that exhibited by the material X (for comparison) which was ordinarily hardened, the material Z has shown the same Charpy impact value as the material X.

(3) Static Fracture Toughness Test

Figure 14:
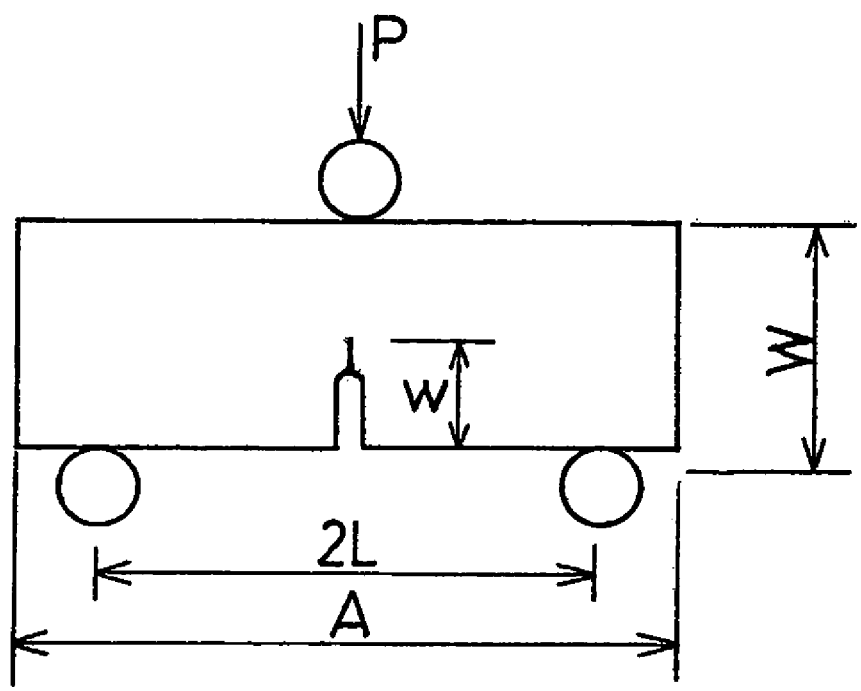
FIG. 14 is a schematic diagram showing a specimen used in measurement of the static fracture toughness.

FIG. 14 illustrates a specimen used in the test to determine the static fracture toughness. After a tear has been made in 1 mm depth in a notched portion of the specimen, a three-point bending static load was applied to determine the breaking load. The following equation was used to calculate the fracture toughness (KIc value). Test results are also shown in Table 5.

$$KIc = (PLa^{1/2}/BW^2)\{5.8 - 9.2(a/W) + 43.6(a/W)^2 - 75.3(a/W)^3 + 77.5(a/W)^4\}$$

TABLE 5

| Material | Test Cycles | KIc (MPa√m) | Ratio of KIc |
|---|---|---|---|
| X | 3 pieces | 16.3 | 1.0 |
| Y | 3 pieces | 16.1 | 1.0 |
| Z | 3 pieces | 18.9 | 1.2 |

Since the depth of crack which had been applied increased to a value greater than the depth of penetration of the carbonitrided layer, there was no difference between the materials X and Y both for comparison. However, the material Z for the invention has shown the value, which is about 1.2 times that, exhibited by the comparative materials.

(4) Static Pressure Breaking Strength Test (Measurement of the Breaking Stress)

A specimen for the static pressure breaking strength test was of such a shape as shown in FIG. 12. The test was carried out by applying a load to the specimen in a direction shown by P, and results of the test are shown in Table 6.

TABLE 6

| Material | Test Cycles | Static Pressure Breaking Strength (kgf) | Ratio of Breaking Strengths |
|---|---|---|---|
| X | 3 pieces | 4,200 | 1.00 |
| Y | 3 pieces | 3,500 | 0.84 |
| Z | 3 pieces | 4,300 | 1.03 |

The material Y, which was subjected to the carbonitriding treatment, has shown the value somewhat lower than that exhibited by the ordinary hardened material Y. However, the material Z for the invention has shown the static pressure breaking strength that is higher than that exhibited by the material Y and that is comparable with that exhibited by the material X.

(5) Secular Change in Dimension

Results of the test conducted to determine the rate of secular change in dimension when kept at 130° C. for 500 hours are shown in Table 7 together with the surface hardness and the amount of residue austenite (0.1 mm in depth).

TABLE 7

| Material | Test Cycles | Surface Hardness (HRC) | Residue γ Amount (vol %) | Dimensional Change Rate (×10⁻⁵) | Ratio of Dimensional Change Rates* |
|---|---|---|---|---|---|
| X | 3 pieces | 62.5 | 9.0 | 18 | 1.0 |
| Y | 3 pieces | 63.5 | 28.0 | 35 | 1.9 |
| Z | 3 pieces | 60.0 | 11.3 | 22 | 1.2 |

*The smaller, the better.

As compared with the material Y which has shown a large amount of residue austenite, it is clear that the material Z for the invention has shown the value which is smaller than half the amount exhibited by the material Y.

(6) Lifetime Test Under Lubrication with Impurity-Containing Lubricant

Using a ball bearing, the rolling fatigue lifetime was evaluated by lubricating it with a lubricant mixed with a predetermined quantity of standard foreign matter. Testing conditions and results of the test are shown in Table 8 and Table 9, respectively.

TABLE 8

| | |
|---|---|
| Load | Fr = 6.86 kN |
| Contact Bearing Pressure | Pmax = 3.2 Gpa |
| r.p.m. | 200 |
| Lubricant | Turbine 56, Dip-feed lubrication |
| Amt. of Foreign Matter | 0.4 g/1,000 cc |
| Foreign Matter | 100 to 180 µm in particle size and Hv800 in hardness |

TABLE 9

| Material | L10 Lifetime (h) | Ratio of L10 Lifetime |
|---|---|---|
| X | 20.0 | 1.0 |
| Y | 50.0 | 2.5 |
| Z | 74.0 | 3.7 |

The conventional carbonitrided material Y has shown the lifetime that is 2.5 times that exhibited by the material X. The material Z for the invention has shown the lifetime that is about 3.7 times that exhibited by the material X. Although the material Z for the invention contain the residue austenite in a quantity smaller than that in the material Y for comparison, the material Z has shown such a long lifetime thanks to microstructure in which nitrogen penetrated and was miniaturized.

The foregoing test results are those given by the use of a rolling bearing. However, even when the method of the present invention is applied to the constant velocity universal joint, particularly to the balls which serve as a ball-joint type coupling member, it is believed that test results similar to those discussed hereinabove in connection with the rolling bearing could be obtained and, accordingly, the material Z of the present invention, that is, the coupling member manufactured by the heat treatment method of the present invention is believed to satisfy three objectives, i.e., prolongation of the rolling fatigue lifetime hitherto considered difficult for the conventional carbonitriding treatment to satisfy, increase of the resistance to cracking and reduction of the secular dimensional change.

Hereinafter, results of a high load rocking endurance test conducted on the constant velocity universal joint according to the second embodiment of the present invention, which has been shown in and described with reference to FIGS. 8A to 9B, will be discussed. It is to be noted that the constant velocity universal joints in the following examples and comparative examples differ from each other depending on whether the predetermined heat treatment discussed previously was applied to the rollers 7 or whether it was applied to the rings 32.

Test conditions and results are shown in Table 10 and Table 11, respectively. The predetermined heat treatment referred to above includes the carbonitriding treatment and the subsequent secondary hardening treatment discussed hereinbefore with reference to FIG. 4. Example (a) applies to the predetermined heat treatment applied to both of the rollers 7 and the rings 32, Example (b) applies to the predetermined heat treatment applied only to the rings 32. In Comparative Examples (a) and (b), an ordinary oil-quenching was performed.

TABLE 10

| Torque (Nm) | 675 |
|---|---|
| r.p.m. | 240 |
| Angle (deg.) | 0 to 10 (rocking) |

TABLE 11

| Position | | Working Hour/Standard Working Hour | | |
|---|---|---|---|---|
| Roller | Ring | 1 | 2 | 3 |
| Com. Exam. (a) | | | | |
| Oil-quench. | Oil-quench | •••••••••O•••••••••X | | |
| Com. Exam. (b) | | | | |
| Oil-quench. | Oil-quench | •••••••••O•••••••••X | | |
| Example (a) | | | | |
| Carbonitriding & Secondary Hardening | Carbonitriding & Secondary Hardening | •••••••••O•••••••••O•••••••X | | |
| Example (b) | | | | |
| Oil-quench. | Carbonitriding & Secondary Hardening | •••••••••O•••••••••O•••••••X | | |

O: Capable of being continuously operated, X: Incapable of being continuously operated The test results are shown in Table 11. With the working hour in each of Comparative Examples (a) and (b) taken as the standard working hour, the value of the working hour in each of Examples (a) and (b), which is divided by the standard working hour, is shown in Table 11. As shown therein, it has been ascertained that the rollers and rings in each of Examples (a) and (b) could continuously work for a length of time that is twice the length of time exhibited by the roller and the ring in each of Comparative Examples (a) and (b), indicating that the predetermined heat treatment according to the present invention is effective to increase the durability.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A constant velocity universal joint, comprising:
an outer coupling member;
an inner coupling member; and
a drive transmitting member operatively interposed between the outer and inner coupling members;
wherein at least one of said outer coupling member, said inner coupling member, and said drive transmitting member has a carbonitrided layer, in which
an austenite grain size is greater than the grade of No. 10 but not in excess of the grade of No. 13, wherein grade No. 10 has a mean area of grain of 122 $\mu m^2$ and a mean diameter of grain for a circular cross section of 13 $\mu m$, and grade No. 13 has a mean area of grain of 15 $\mu m^2$ and a mean diameter of grain for a circular cross section of 4.4 $\mu m$,
a breaking stress is equal to or higher than 2,650 MPa, and
a hydrogen content is within a range 0.3 to 0.5 ppm,
the outer coupling member has an inner peripheral surface formed with an axially extending track groove defined at three locations in a circumferential direction thereof and also has roller guide faces defined on respective sides of the track groove,
the inner coupling member comprises a tripod member having a bearing shank formed at three locations in a circumferential direction thereof so as to protrude radially outwardly therefrom, and
the drive transmitting member includes a roller rotatably mounted on the corresponding bearing shank through a plurality of needle rollers and operatively accommodated within the corresponding track groove in the outer coupling member, with an outer peripheral surface of said roller being guided by the roller guide faces.

2. A constant velocity universal joint, comprising:
an outer coupling member;
an inner coupling member; and
a drive transmitting member operatively interposed between the outer and inner coupling members;
wherein at least one of said outer coupling member, said inner coupling member, and said drive transmitting member has a carbonitrided layer, in which
an austenite grain size is greater than the grade of No. 10 but not in excess of the grade of No. 13, wherein grade No. 10 has a mean area of grain of 122 $\mu m^2$ and a mean diameter of grain for a circular cross section of 13 $\mu m$, and grade No. 13 has a mean area of grain of 15 $\mu m^2$ and a mean diameter of grain for a circular cross section of 4.4 $\mu m$,
a breaking stress is equal to or higher than 2,650 MPa, and
a hydrogen content is within a range 0.3 to 0.5 ppm,
the outer coupling member has three track grooves, each of said track grooves being delimited by roller guide faces defined on respective sides of the corresponding track grooves so as to confront with each other in a direction circumferentially thereof,
wherein the inner coupling member comprises a tripod member having three bearing shanks each extending radially outwardly therefrom, and
wherein the drive transmitting member includes a roller rotatably inserted in each of the track grooves, and a ring mounted on each of the bearing shanks to rotatably support the corresponding roller, said roller being movable in a direction axially of the outer coupling member along the associated roller guide faces.

* * * * *